Aug. 21, 1923.  
P. ZIMMER  
1,465,326  
MACHINE FOR THE MANUFACTURING OF SWEETMEATS  
Filed Aug. 4, 1922
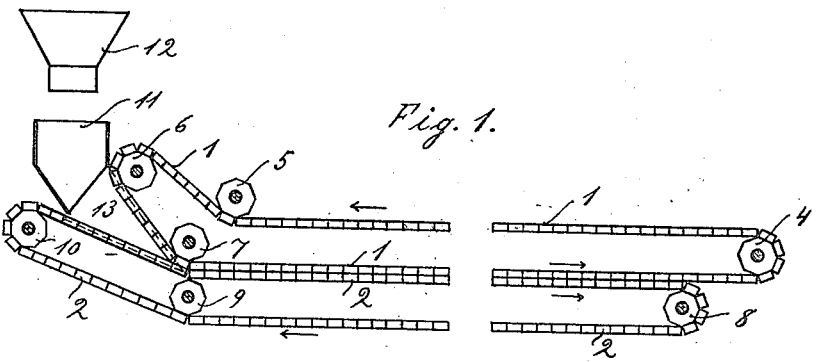
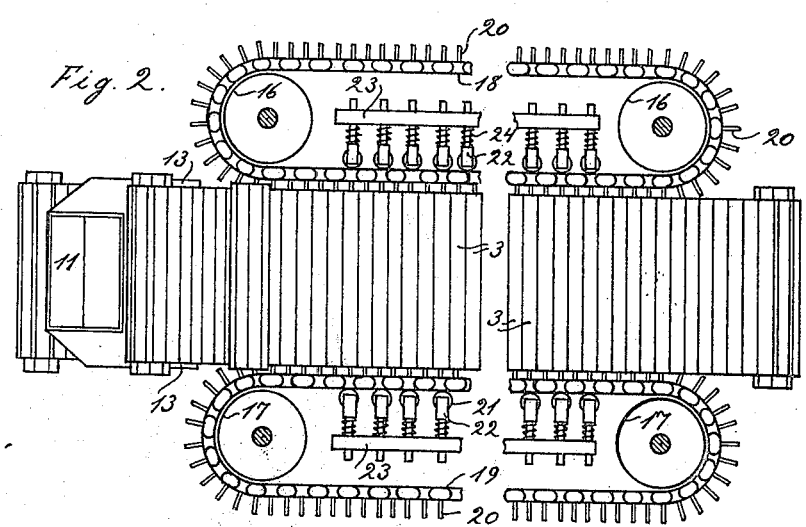
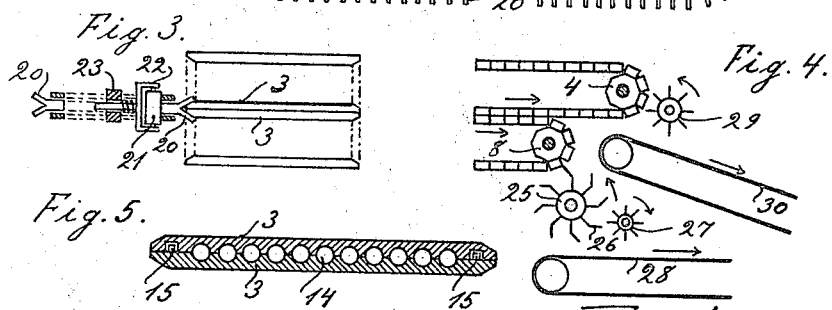
Inventor:—  
Paul Zimmer  
By his attorney Patented Aug. 21, 1923.

1,465,326

UNITED STATES PATENT OFFICE.

PAUL ZIMMER, OF WURZBURG, GERMANY.

MACHINE FOR THE MANUFACTURING OF SWEETMEATS.

Application filed August 4, 1922. Serial No. 579,585.

*To all whom it may concern:*

Be it known that I, PAUL ZIMMER, a citizen of the German Republic, residing at Wurzburg, Germany, have invented certain new and useful Improvements in Machines for the Manufacturing of Sweetmeats (for which I filed application in Germany on the 23d October, 1920), of which the following is a specification.

This invention relates to a machine by means of which confectionery is produced in one operation directly from the liquid mass of sugar or juice of fruit. The mass has hitherto been poured separately into each mould of a mould board and this requires much time. In opposition to this method the invention has for its object to permit the distribution of the liquid mass into the moulds automatically without the use of a repartition device.

According to the known manufacturing methods the sweetmeats must further remain for a long time in the moulds in order to dry well and to solidify and they are exposed during this time to dust and flies. This is avoided also if the improved machine is used which works in such a manner that the hand of the workman does not come in contact with the raw material nor with the finished sweetmeats.

According to the invention the moulding plates which form in pairs hollow bodies closed on all sides are joined to endless chains which are guided over drums so that the plates which belong together are placed flatly the one against the other and enclose between them part of the mass fed between the chains.

The use of chains is known per se in the manufacturing of sweetmeats, but the devices of known construction, for instance endless knife chains, serve merely for working or cutting semi-consistant kneadable material, the invention having however for its object a machine or device for the direct working of liquid material.

The improved machine permits also to produce in one piece sweetmeats which present curved surfaces on all sides, for instance spherical or egg-shaped bodies, which up to the present had to be made of two parts stuck together at the plane surfaces.

In order that the invention may be clearly understood, I shall hereafter proceed to describe the same with reference to the form of construction of the improved machine shown by way of example on the accompanying drawing, wherein:—

Fig. 1 is a side elevation of the machine.
Fig. 2 shows the same in plan view.
Fig. 3 is a cross section of half the machine.
Fig. 4 represents the device for the removal of the finished sweetmeats from the machine.
Fig. 5 shows one pair of moulding plates working together.

The machine consists essentially of a great number of moulding plates which are united by means of hinges so that they form two long chains guided over drums in such a manner that the two moulding plates which belong together come in contact the one with the other and grip at this instant a quantity of the sugar mass or other material fed between the chains which is sufficient to fill the hollow space between said two moulding plates. According to Fig. 1 the two chains 1 and 2 composed of the moulding plates 3, 3 (Fig. 5) are guided the one over the drums 4, 5, 6 and 7 and the other over the drums 8, 9 and 10. The drums which are driven in any convenient manner for instance by toothed wheels or chains are of octagonal cross section. The width of the drums corresponds with the average width of the moulding plates so that the chains are drawn along if the drums revolve. The drums are arranged in such a manner that the two endless chains diverge at the front end of the machine so that the liquid sugar or other substance can be fed between the two chains with the aid of a funnel 12 and tube 11. The inlet tube 11 has forwardly extending side walls which fit tightly against the moulding plates so that the material pressed into the moulds cannot flow off sidewards. The side walls 13 extend to the point between the two chains 1, 2 where the moulding plates, which belong together, come in contact. Each chain comprises exactly the same number of moulding plates so that always the same moulding plates come in contact. The moulding plates 3 have cavities 14 (Fig. 5) designed to receive the material. In order to ensure that the mutual position of every two moulding plates be always the same the moulding plates of one chain have studs 15 (Fig. 5) designed to engage with holes of the moulding plates of the other chain.

The endless chains 1, 2 are of such a length that the material enclosed between the moulding plates 3, 3 in the cavities 14 can cool and solidify during the long travel of about 60 meters. Refrigerating devices can be provided through which the chains must move.

The following arrangement serves to ensure that the moulding plates remain in close contact on their common travel. At the side of the two middle sides of the chains 1 and 2 two chains 18 and 19 are guided in parallel planes over sprocket wheels 16, 16 and 17, 17, each link of said chains carrying angular clamps 20. These clamps grip each over two moulding plates 3, 3 (Fig. 3) and hold the same fixedly the one upon the other during the whole travel as the chains 18, 19 move with the same speed as the moulding plates. Pressure rollers 21 are provided for preventing the chains 18, 19 to slacken whereby the clamps 20 could release the moulding plates. These pressure rollers 21 are mounted in shackles 22 guided in fixed rails 23 and controlled by springs 24 so that the rollers 21 press the clamps against the moulding plates which are bevelled at the edges.

If the moulding plates which belong together separate at the end of their common travel the sweetmeats which have solidified and cooled remain generally in the moulding plate of the lower chain. A cylinder 25 (Fig. 4) with blade-like radially projecting knives 26 is therefore provided at this end of the machine, said knives serving to dig the sweetmeats out of the moulding plates. A second cylinder 27 with radial arms is provided for stripping the sweetmeats off the knives 26 so that the sweetmeats drop upon a conveying band 28. Sweetmeats which should stick in the upper moulding plates are removed by the arms of a cylinder 29 and drop upon a conveying band 30 from which they drop upon the conveying band 28.

I claim:—

1. An improved machine for manufacturing sweetmeats directly from the liquid mass, comprising in combination two endless chains composed of hingedly connected moulding plates designed to form closed moulds, rotatable drums of octagonal cross section over which said drums are guided and which are arranged so that the endless chains diverge at the front end of the machine at a convenient angle, a feeding funnel for the liquid material arranged between the diverging parts of the endless chains at the front end of the machine to fill the moulding plates with material, side plates projecting from said funnel at either side of the endless chains, means at the rear end of the machine for removing the solidified sweetmeats from the moulding plates, two endless chains one at either side of the endless mould chains and holding clamps projecting from the links of said endless chains designed to grip the corresponding mould plates and to maintain them tightly closed for the greatest part of their travel.

2. An improved machine for manufacturing sweetmeats directly from the liquid mass, comprising in combination two endless chains composed of hingedly connected moulding plates designed to form closed moulds, rotatable drums of octagonal cross section over which said drums are guided and which are arranged so that the endless chains diverge at the front end of the machine at a convenient angle, a feeding funnel for the liquid material arranged between the diverging parts of the endless chains at the front end of the machine to fill the moulding plates with material, side plates projecting from said funnel at either side of the endless chains, means at the rear end of the machine for removing the solidified sweetmeats from the moulding plates, two endless chains one at either side of the endless mould chains, holding clamps projecting from the links of said endless chains designed to grip the corresponding mould plates and to maintain them tightly closed for the greatest part of their travel, and spring controlled pressure rollers acting upon the inner side of the endless clamp chains to maintain the same at stretched state.

In testimony whereof I affix my signature in presence of two witnesses.

PAUL ZIMMER.

Witnesses:
ALEXANDER DE SOTO,
ALESEI PHILIPPOFF.